July 17, 1934.  F. LICHTENBERGER ET AL  1,966,984
WELDED JOINT TESTER
Filed July 31, 1931
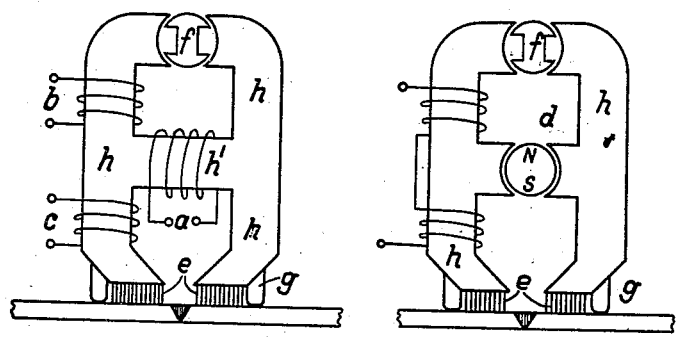
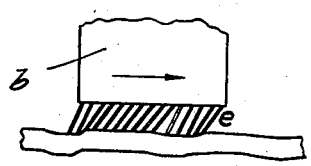
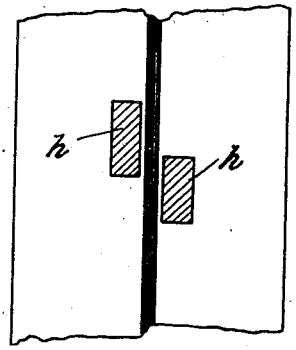
Inventors
Fritz Lichtenberger
and Hans Mauch
By Patented July 17, 1934

1,966,984

UNITED STATES PATENT OFFICE 1,966,984

WELDED-JOINT TESTER

Fritz Lichtenberger and Hans Mauch, Berlin-Charlottenburg, Germany

Application July 31, 1931, Serial No. 554,344
In Germany August 9, 1930

6 Claims. (Cl. 175—183)

The subject matter of the present invention relates to a welded-joint tester which indicates even small differences in the quality of a welded joint. In accordance with this invention provision is made for two magnetic circuits—one for the welded joint and the other for the standard or comparison magnetic reluctance. These two magnetic circuits have one part in common, so that a magnetic compensating connection is formed in the shape of an H. The subject matter of the invention affords the following advantages. There are only two contact points for the magnetic flux which are bridged over by wire brushes; diminution of the stray losses and, consequently, a very high degree of accuracy in the measurements; independence of the form of the material to be tested; simplicity of design, inexpensive and admirably suited for every day work.

Figs. 1 and 2 each show a form of construction of a coupled magnetic double circuit of this kind. Figs. 3 and 4 show details.

The apparatus consists mainly of an H-shaped magnet body $h$, $h$. This magnet body is given the shape of an H. Arranged on the common, intermediate piece $h'$ is a coil $a$ to which best of all a telephone or other measuring instrument adjusted on the zero method can be connected. The coils $b$ and $c$ are wound on the limbs of the main magnet body $h$. The magnetic flux is produced in both circuits by connecting the coils $b$ and $c$ in series. In the case of alternating current, the core of the magnet is naturally made up of plates. The comparison magnetic reluctance $f$, in the form of one or more rotatable or displaceable pieces of magnetic material, is arranged in the upper portion of the magnet body; when the comparison magnetic reluctance is displaced, the reluctance can be varied. The exciter coils $b$, $c$ and the indicating member $a$ can very easily be changed over, so that the coil $a$ carries the exciter current, whilst the coils $b$ and $c$ are connected to the telephone or to the reading instrument. The lower end of the apparatus is fitted with wire brushes $e$ and contact chariot $g$. By means of these brushes $e$, the test apparatus is pressed in such a way on to the test piece that the sledges $g$ slide over the test piece, so that the brushes $e$, in a more or less compressed condition, maintain the magnetic flux between the test piece and the test apparatus. The test apparatus is guided in such a manner along the welded joint that is to be tested that the welded joint passes between the brushes $e$, and the magnetic flux flows from the brushes $e$ obliquely through the welded joint which is to be tested.

If the magnetic reluctance of the flux of the lines of force in the lower half of the measuring apparatus across the welded joint which is to be tested be equal to that in the upper magnetic circuit of the lines of force, which passes through the magnetic regulating reluctance $f$, no current will flow in the common, main yoke, i. e., through the measuring coil $a$. When, however, the magnetic resistances in these two circuits of lines of force are not equal, a current will be set up which can be ascertained by listening-in on the telephone connected to the coil $a$ or which can be read off by means of a measuring instrument.

In Fig. 2, a polarized magnet piece is substituted for the measuring coil $a$, whereby the magnetization is effected transversely to the axis.

The sensitivity is increased by giving the resistance of the welded joint in the circuit as high as possible a percentage share, that is to say, by keeping to other resistances, more particularly the intermediate resistance between the test apparatus and the test piece, as low as possible.

Fig. 3 shows that the magnetic reluctance of each individual wire on the brushes is independent of its oblique position. The whole apparatus is guided on castors or better still by means of the slide $g$ so as always to be at the same distance from the test piece. The slides offer the advantage that, unlike the castors, they cannot drop into holes in the material and thus they provide a smoother run. An important factor is that in the case of the arrangement described the brushes as well as the slides do not run on the rough welded joint but alongside it.

In the case of an alternating current being used, the eddy currents set up in the test piece become more and more a decisive factor as the frequency rises. In this case, therefore, the electric conductivity and not the magnetic conductivity is the measure of the quality of the welded joint. In order that the eddy currents can be made to flow more obliquely to the welded joint and thus allow of the boundary surfaces of welded joint and iron being tested, it is advisable that the poles be arranged stepwise, as shown in Fig. 4. Moreover, it will be found convenient if the poles and brushes are made interchangeable for the various thickness of plate and nature of welded joint (butt, lapped).

By means of this invention, faults in the welded joint can be directly determined merely by running the test apparatus over the welded joint; the absolute magnitude of the fault is determined by the rotation of the comparison reluctance f necessary for entire compensation at the faulty point. The comparison reluctance is calibrated with the aid of test joints the strength of which has been ascertained by actual test.

This welded-joint tester can of course also be used for the purpose of testing any other magnetic material.

We claim:—

1. An electric welded-joint tester comprising a magnetic circuit for measuring the magnetic reluctance of the welded joint, and spaced flexible brushes arranged in said magnetic circuit for establishing magnetic contact and for directing the magnetic flux in said circuit through the welded joint.

2. An electric welded-joint tester comprising a magnetic circuit for measuring the magnetic reluctance of the welded joint, spaced flexible brushes arranged in said magnetic circuit for establishing magnetic contact and for directing the magnetic flux in said circuit through the welded joint, and means for limiting the flexing of said brushes.

3. An electric welded-joint tester comprising a magnetic circuit for measuring the magnetic reluctance of the welded joint, and spaced wire brushes arranged in said magnetic circuit for establishing magnetic contact and for directing the magnetic flux in said circuit through the welded joint.

4. An electric welded-joint tester comprising a magnetic circuit for measuring the magnetic reluctance of the welded joint, a second magnetic circuit having a part common to the first named magnetic circuit, an adjustable comparison magnetic reluctance within the second named magnetic circuit, a winding on the common part of the said circuits, said winding being adapted to influence an instrument for indicating the varaton of the magnetc flux in said common part, and spaced wire brushes for establishing magnetic contact and for directing the magnetic flux in said first mentioned circuit through the welded joint.

5. An electric welded-joint tester comprising a magnetic circuit for measuring the magnetic reluctance of the welded joint, a second magnetic circuit having a part common to the first named magnetic circuit, an adjustable comparison magnetic reluctance within the said second magnetic circuit, said comparison reluctance comprising a member rotatable within said common part of said magnetic circuits for indicating the variation of the magnetic flux in said common part, and spaced wire brushes for establishing magnetic contact and for directing the magnetic flux in said first mentioned magnetic circuit through the welded joint.

6. An electric welded-joint tester comprising a magnetic circuit for measuring the magnetic reluctance of the welded joint, and a pair of spaced flexible brushes for establishing magnetic contact and for directing the magnetic flux in the said circuit through the welded joint, said brushes being displaced one in advance of the other.

FRITZ LICHTENBERGER.
HANS MAUCH.